Figure 1:
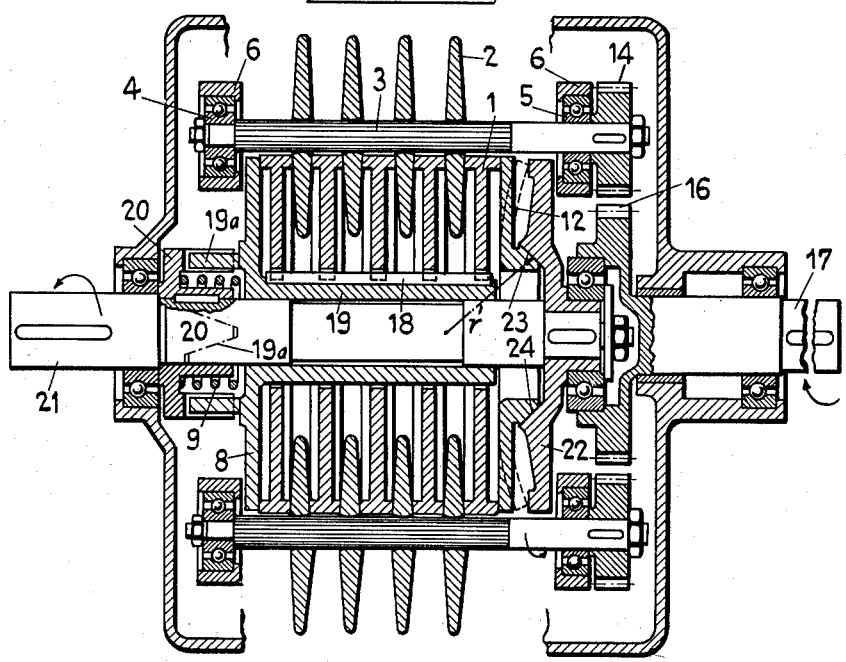

Dec. 30, 1952    J. BEIER    2,623,396
INFINITELY VARIABLE FRICTION WHEEL GEAR
Filed April 23, 1949

INVENTOR:
JOSEF BEIER
BY Leon M. Straus

Patented Dec. 30, 1952

2,623,396

UNITED STATES PATENT OFFICE 2,623,396

INFINITELY VARIABLE FRICTION WHEEL GEAR

Josef Beier, Altmunster-Ebenzweier, Upper Austria, Austria

Application April 23, 1949, Serial No. 89,331

7 Claims. (Cl. 74—199)

This invention relates to power transmission mechanisms.

In friction wheel gears for increased power transmissions it is necessary to provide a larger number of points of transmission. For this purpose several friction elements are arranged on each shaft, however, the number of friction elements which can be arranged on a single shaft is limited. Therefore up to three outer shafts disposed about a concentric central shaft have been arranged heretofore, so that a centrally applied surface pressure on these outer shafts may be equally distributed.

The main object of the present invention is to provide means rendering the possibility of arranging four or more outer shafts concentrically about a central shaft and affording nevertheless the attainment of a sufficiently equal distribution of the surface pressure applied to the friction elements of the outer shafts.

Figure 2:
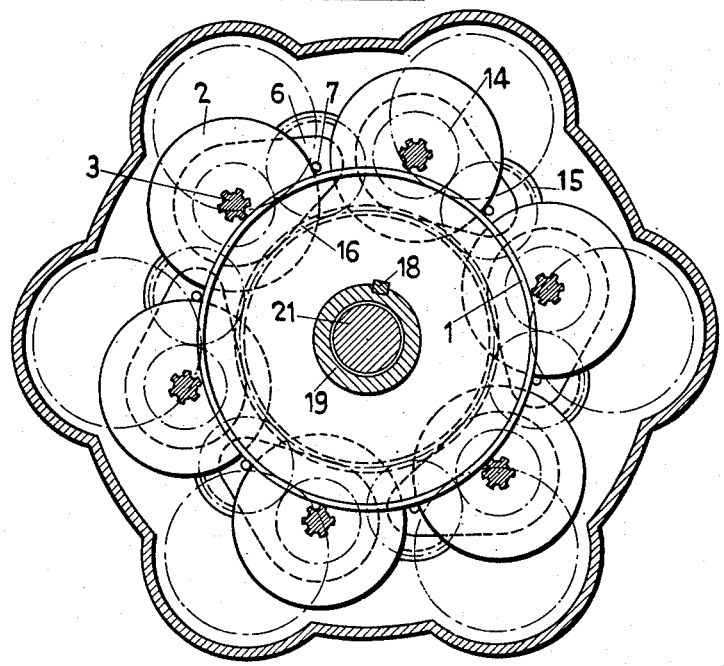

Other objects of the invention will become apparent from the following disclosure and the drawing, in which:

Figs. 1 and 2 illustrate by way of example an embodiment of the present invention in which six outer shafts have been arranged. On the central hub 19, the central friction elements 1 are arranged axially displaceably in series. Said friction elements consist of relatively thin flat springy or resilient disks provided with a narrow bearing rim at their outer circumference (rim disks). Between said elements six rows of counter-elements 2 engage, said counter-elements consisting of substantially flat and cone-shaped disks (cone disks). These are similarly arranged axially displaceably on the spline shafts 3, said spline shafts being mounted in the swivel brackets 6 by means of the bearings 4 and 5. The swivel brackets are pivotable about the pins 7, and the spline shafts 3 and the counter-elements 2 respectively are brought more or less near to the central shaft of the gear, thus enabling the ratio of the gear to be infinitely varied.

The necessary surface pressure for the creation of the frictional forces at the point of engagement is provided by pressing the central friction elements (rim disks 1) together. To assist in this pressing action end disk 8 is provided, which is forced to the right against the rim disks either by a spring 9 or/and by a special device the operation of which will be described hereafter. This surface pressure is then transmitted through all of the rim disks and cone disks and is taken up by the opposite end disk 12 at the other end.

From or to the spline shafts 3 the power is transmitted by gear wheels 14 located on the spline shafts, said gear wheels 14 being in engagement with six gear wheels 15 which rotate about the swivel pins 7. These gear wheels 15 are in their turn in mesh with a common central gear wheel 16, said gear wheel 16 being rigidly connected with the concentric shaft 17. Assuming that this shaft 17 is rotated, the gear wheel 16 then sets the spline shafts 3 through the gear wheels 14 and 15 and with them the cone disks 2 into rotation. From the cone disks 2 the power is now transmitted to the rim disk 1 and through the key 18 to the hub 19 of the end disk 8. The cams 19a are arranged on the latter which are in engagement by their inclined surface with the counter-cam 20 which latter is rigidly connected with the shaft 21. This execution of the cams and counter-cams produces the effect that in transmitting the torque through interengageable means consisting of the pressure disk 8 and cams and counter-cams (19a and 20) to the shaft 21 a pressure proportional to the torque transmitted is exerted on the end disk 8 in the axial direction. This proportionality of the surface pressure gives the advantage that the friction elements are only subjected to a high surface pressure when it is necessary to transmit greater forces; thus the wear and tear of the gear is reduced. Furthermore during partial load the losses in the gear are reduced by the decreased surface pressure and thus the efficiency at partial load is increased. It is also to be remarked that through a respective execution of the cams and counter-cams it is possible to obtain a surface pressure not exactly proportional to the loading but in any other relation to the loading desired.

It is of the greatest importance that the central, axial surface pressure created by the spring 9 or the cams 19a, 20 or by a combination of the spring and cams is transmitted as equally as possible to the six outer shafts. For this purpose at least one end disk (8 or 12) or both end disks according to the invention are of thin cross section so as to act with sufficient resiliency in the axial direction whereby despite the statically undefined engagement in more than three points (in the present example in six points) a practically equal transmission of the central axial pressure is produced. In order to prevent an inadmissible amount of bending of the end disks when the gear is being overloaded, as e. g. by shocks, their bending may be limited. For this purpose as is shown in the right-hand end disk 12, a strong limiting disk 22 is arranged in such a manner that the corresponding end disk only comes into engagement after a certain amount of bending, which is for example illustrated by the assumed position of end disk 12 indicated in dotted lines in Fig. 1.

In order that larger inaccuracies of manufacture which can occur at the outer shafts do not have to be taken care of solely by the resiliency of the end disks according to the invention, one end disk can be displaceably mounted in such a manner that it can adjust itself in a plane given by the average force of all the axial pressures. In this case only the slight inaccuracies at the individual outside shafts need be balanced by the resiliency of the end disks. To achieve the mobility mentioned, the end disk can, e. g. be provided with a spherical surface having the radius $r$ engaging in a counter-spherical surface 24 of the same radius machined into the support disk 22.

The required inclined position of the counter-friction elements (cone disks 2) caused by the elastic deflection of the end disks is achieved by a ball-like execution at their bearing point on the spline shafts as is shown in Fig. 1.

It is to be understood that, if necessary, the end disks can be formed of spring steel and can be correspondingly tempered.

What I claim and wish to secure by Letters Patent is:

1. An infinitely variable friction wheel gear comprising a series of central friction elements a plurality of parallel shafts, more than three series of counter-rotating friction elements arranged concentrically with respect to the central rotating friction elements and disposed, respectively, on said parallel shafts for coaction with said central friction elements, and at least one axially resilient end disk on the axis of the central friction elements and arranged to extend with respect to said central friction elements in such manner, that despite the statically undefined contact in more than three points a sufficient power transmission at all the counter-rotating friction elements is assured.

2. In a variable speed mechanism; a centrally arranged shaft to which a torque is transmitted from a concentrically arranged friction mechanism, said mechanism comprising a driving shaft, a plurality of centrally arranged relatively thin and resilient friction disks, at least more than three shafts concentrically arranged around said centrally arranged shaft, means for driving said concentrically arranged shafts and in operative connection with said driving shaft, each of said concentrically arranged shafts carrying at least more than three counter-rotating friction disks driven by said concentrically arranged shafts, respectively, and in frictional engagement with said centrally arranged friction disks, and resilient means arranged at one end of said centrally arranged friction disks and said centrally arranged shaft and adapted to transmit power to the latter from said centrally arranged friction disks.

3. In a variable speed transmitting device; a centrally arranged shaft to which a torque is transmitted from a concentrically arranged friction mechanism, said mechanism comprising a plurality of centrally arranged relatively thin and resilient friction disks, at least more than three shafts concentrically arranged around said centrally arranged shaft, each of said concentrically arranged shafts carrying at least more than three counter-rotating friction disks driven by said shafts, respectively, and in frictional engagement with said centrally arranged friction disks, resilient end means arranged at at least one end of said centrally arranged friction disks and for cooperation with the latter, and cam means adapted to transmit power from said centrally arranged friction disks and said end means to said centrally arranged shaft.

4. In a variable change-speed gear; a central hub, central friction elements axially displaceable on said hub, said central friction elements forming flat resilient disks provided with bearing rims at the outer circumference thereof, a plurality of shafts arranged concentrically to said hub, a plurality of cone-shaped disks seated on said shafts, respectively, each of said cone-shaped disks being provided with ball-shaped hubs whereby said cone-shaped disks are axially displaceable on said shafts, said bearing rims of said central friction elements being located substantially adjacent said hubs of said cone-shaped disks, and respective swivel means pivotally supporting said shafts of said cone-shaped disks, whereby said cone-shaped disks may change their position with respect to said central hub thus enabling the ratio of the gear to be infinitely varied.

5. In a variable change-speed gear according to claim 4, including spring supported means positioned at at least one end of said central friction elements, whereby surface pressure is transmitted through said bearing rims of said central friction elements to said conically shaped disks.

6. In a variable change-speed gear according to claim 4, including means for automatically changing the surface pressure on said central friction disks.

7. In a variable speed transmitting device; a power shaft, a centrally arranged shaft to which a torque is to be transmitted from said power shaft, a concentrically arranged friction mechanism, said mechanism comprising a plurality of spaced centrally arranged relatively thin and resilient friction elements seated for displacement on said centrally arranged shaft, at least more than three spline shafts including swivel supports therefor and concentrically disposed to said centrally arranged shaft, a plurality of cone-shaped disks having hubs displaceably seated on said spline shafts, each of said friction elements being provided with peripheral opposite bearing surfaces in contact with said cone-shaped disks adjacent the hubs of the latter, gear means in driving connection with said spline shafts and said power shaft, whereby the latter transmits rotational movement to said spline shafts, thence to said cone-shaped disks and to said friction elements on said centrally arranged shaft, and interengageable means on said latter shaft and disposed endwise of said friction elements, said interengageable means including spring means urging a portion of said interengageable means against said friction elements to thereby transmit torque from the latter to said centrally arranged shaft, said spline shafts being shiftable about said supports with respect to said gear means and said power shaft.

JOSEF BEIER.

REFERENCES CITED

The following references are of record in the file of this patent:

UNITED STATES PATENTS

| Number | Name | Date |
|---|---|---|
| 929,405 | Dill | July 27, 1909 |
| 1,042,720 | Richards | Oct. 29, 1912 |
| 1,616,311 | Pelterie | Feb. 1, 1927 |
| 1,823,226 | Abbott | Sept. 15, 1931 |
| 1,963,599 | Tscherne | June 19, 1934 |
| 2,040,831 | Chilton | May 19, 1936 |
| 2,216,642 | Davis | Oct. 1, 1940 |
| 2,222,281 | Beier | Nov. 19, 1940 |

FOREIGN PATENTS

| Number | Country | Date |
|---|---|---|
| 798,244 | France | Mar. 2, 1936 |